May 18, 1943 O. H. BANKER Re. 22,312

AUTOMATIC TRANSMISSION

Original Filed Sept. 18, 1936 7 Sheets-Sheet 1

Inventor:
Oscar H. Banker
By [illegible]
Its Atty.

May 18, 1943 O. H. BANKER Re. 22,312

AUTOMATIC TRANSMISSION

Original Filed Sept. 18, 1936 7 Sheets-Sheet 2

Inventor:
Oscar H. Banker
By
Arne Ostfeldt
Atty.

AUTOMATIC TRANSMISSION

Original Filed Sept. 18, 1936 7 Sheets-Sheet 3

Inventor:
Oscar H. Banker
By Owen Osborn his Atty.

AUTOMATIC TRANSMISSION

Original Filed Sept. 18, 1936 7 Sheets-Sheet 4

Inventor:
Oscar H. Banker
By Clarence E. Hoffman his Atty.

AUTOMATIC TRANSMISSION

Original Filed Sept. 18, 1936 7 Sheets-Sheet 5

Inventor:
Oscar H. Banker
By Clarence A. Seifert
his Atty.

May 18, 1943 O. H. BANKER Re. 22,312

AUTOMATIC TRANSMISSION

Original Filed Sept. 18, 1936 7 Sheets-Sheet 6

Inventor:
Oscar H. Banker
By Arne Ertsgaard
his Atty.

AUTOMATIC TRANSMISSION

Original Filed Sept. 18, 1936 7 Sheets-Sheet 7

Inventor:
Oscar H. Banker
By Olive Clark Hoffman
his Atty.

Reissued May 18, 1943

Re. 22,312

UNITED STATES PATENT OFFICE 22,312

AUTOMATIC TRANSMISSION

Oscar H. Banker, Chicago, Ill., assignor to New Products Corporation, Chicago, Ill., a corporation of Delaware Original No. 2,262,747, dated November 18, 1941, Serial No. 101,450, September 18, 1936. Application for reissue January 31, 1942, Serial No. 429,099

7 Claims. (Cl. 74—328)

This invention relates to transmission devices and more particularly to an automatic transmission of a type particularly adapted for use in automotive vehicles. It is an object of the invention to provide a new and improved automatic transmission for this purpose.

Another object is to provide a new and improved transmission affording four forward speeds in a compact unit.

Another object is to provide an automatic transmission of this type.

Another object is to provide such an automatic transmission with silent third and fourth speeds by using planetary gearing for third speed and having no gearing between the motor and the rear axle gearing at fourth speed.

Another object is to provide an automatic four-speed transmission unit so arranged that the change from third speed to fourth speed may be made only after the car has attained a predetermined speed.

Another and important object of the invention is to provide an automatic four-speed transmission which enables the use of high speed rear axle gears in an automobile, so that when in fourth speed the automobile will be operating with a minimum engine speed and a minimum of parts in rotation transmitting power. In present day practice, it is customary to furnish, with a three-speed transmission, and low speed rear axle gearing, an "overdrive" device so that at high car speeds (when the three-speed transmission is in "high" and a 1:1 ratio) there are two sets of gearing in operation, i. e., the "overdrive" mechanism and the rear axle gears. In the present invention, by embodying the means for obtaining a fourth speed in a compact transmission unit, a lower propeller shaft speed is obtained at all car speeds, and at high car speeds only one set of gearing is in operation, i. e., the rear axle gears.

Another object is to provide a four-speed automatic transmission arranged so that in accelerating the car the shift will be from first to third and then from third to fourth, the shift from third to fourth being attainable when the car speed is about 30 miles per hour and both shifts being automatically effected but initiated under the control of the operator of the car.

A further object is to provide such a transmission with means for positively shifting from fourth back to second for hill climbing purposes, or other purposes requiring increased power, this means serving to shift from third back to first when the car is traveling in third speed.

Yet a further object is to provide an automatic transmission, including planetary gearing, shiftable to at least first, second and third gear forward, in which the engine is effective to brake the car when the transmission is in any gear above second.

Still a further object is to provide an automatic transmission having first, second, third and fourth speeds in which the engine is effective to brake the car when the transmission is in third or fourth speeds and is effective to brake the car in first and second speeds at the option of the driver.

Further objects and advantages will become apparent from the following detailed description taken in connection with the accompanying drawings, wherein.

Figure 1:
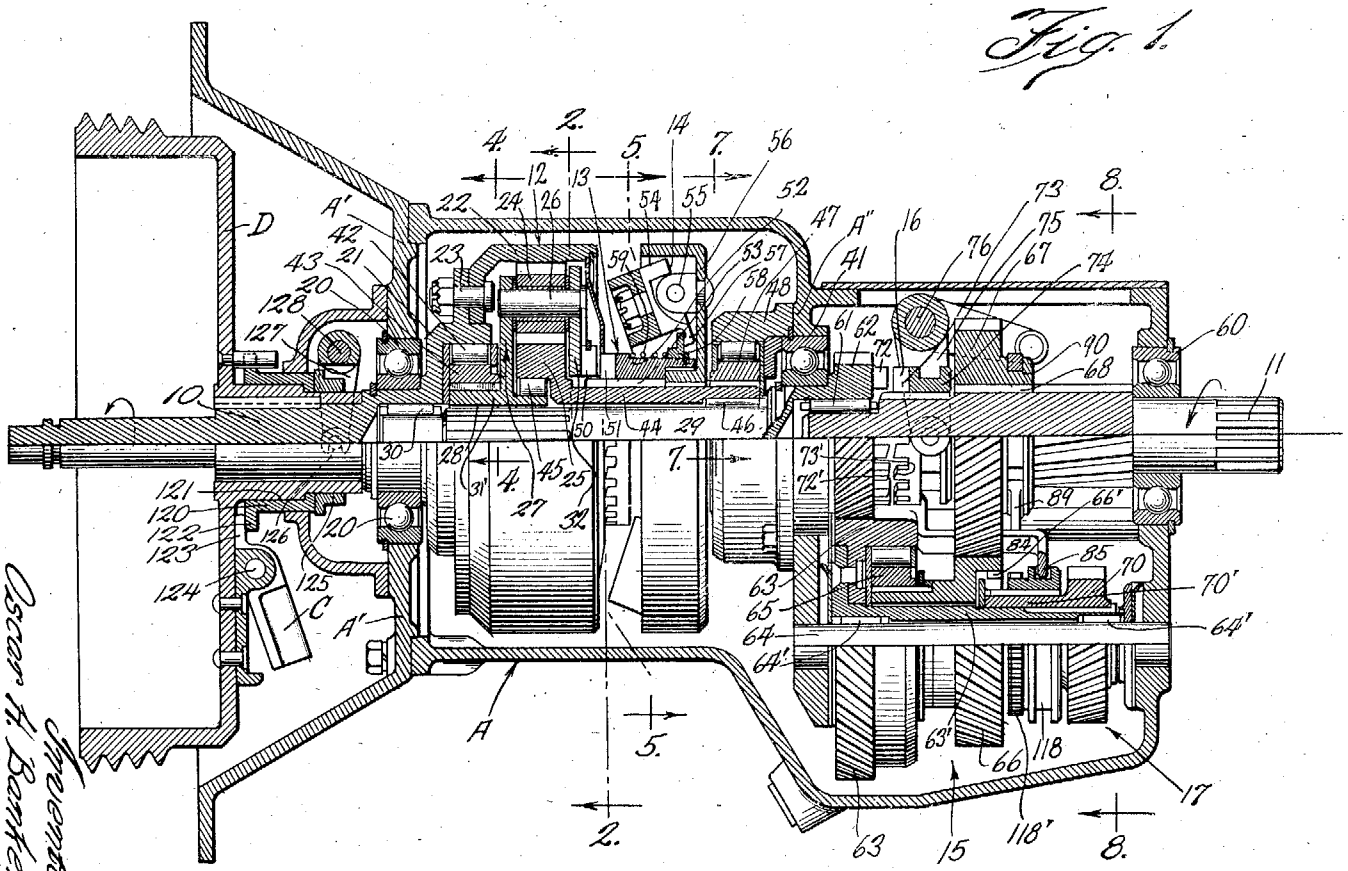
Fig. 1 is a longitudinal central section through a preferred form of the invention.

Although I have shown in the drawings and shall herein describe in detail a preferred form of the invention, adapted for use in an automotive vehicle, it is to be understood that the disclosure is to be taken as an exemplification of the principles of the invention and is not intended to limit the invention to the particular embodiment illustrated. The scope of the invention will be pointed out in the appended claims.

The invention is herein disclosed embodied principally in a four-speed transmission unit as employed in conjunction with high speed rear axle gearing. Hereinafter the transmission will be referred to as having "first," "second," "third" and "fourth" gear or speeds. The gearing for first, second and third may be selected in view of the high speed rear axle gearing to produce car speeds comparable to the speeds produced by the present day three-speed hand operated transmission. Fourth gear, herein, produces a car speed comparable to the car speed produced by a present day "overdrive." The transmission is contained in a casing A (Figs. 1 and 13) which may be suitably mounted upon the vehicle chassis. A drive shaft 10 is rotatably mounted in the casing in axial alinement with a driven shaft 11, herein connected by a flexible couping 11', a propeller shaft 11'', and differential rear axle gearing generally designates B (see Fig. 13) to a rear axle E. The differential gearing is of usual construction but is designed in view of the construction of the transmission to have a gear ratio of approximately 3:1. The drive shaft 10 may be connected to the driven shaft 11 (see Fig. 1) by means including a planetary gear device 12, a clutch device 13 of the overrunning jaw type (for shifting from third to fourth), centrifugally operated mechanism 14 for actuating clutch 13, reduction gearing 15 of the spur type which is in operation for both first and second gear, a clutch device 16 for shifting from first to third and vice versa and from fourth to second, and reverse gearing 17 engageable by manually shiftable means.

In order that the construction of the transmission, about to be described, may be more readily understood, it is mentioned briefly that when the transmission is in first gear the power from drive shaft 10 to driven shaft 11 is transmitted through the planetary gear device 12 and the reduction gearing 15, both the clutch 13 and the clutch 16 being disengaged, the gear ratio between the shafts being approximately 3.3 to 1. The transmission is automatically shifted, with the time of the shift under the control of the operator, from first directly to third gear by causing clutch 16 to engage, thereby cutting out the reduction gearing 15. Power is now transmitted from the drive shaft 10 through the planetary gear device 12 directly to the driven shaft 11 at a gear ratio of approximately 1.6 to 1. To place the transmission in fourth gear, clutch 13 is automatically shifted, with the time of the shift again under the control of the operator of the car, to lock the planetary gear device and cause the same to rotate as a unit. Both the clutch 13 and the clutch 16 are now in engagement thereby locking the transmission so that power is transmitted directly from the drive shaft 10 to the driven shaft 11 at a ratio of 1:1. Second gear is obtained by disengaging clutch 16 thereby again rendering the reduction gearing 15 effective while clutch 13 is in engagement. In second the gear ratio is approximately 2.08 to 1. Such disengagement of the clutch 16 herein is effected manually and is primarily employed to shift the transmission from fourth gear to second gear. When the transmission is in third gear, disengagement of the clutch 16 shifts the transmission to first gear.

More particularly the drive shaft 10 is rotatably mounted in one end wall A' of the casing by means of a bearing 20 and has a flanged portion 21 to the outer edge of which a gear element 22 is secured by means of a plurality of bolt and nut devices 23. The gear 22 forms one member, herein a sun or orbit gear, of the planetary gear device 12 and preferably is formed as an internal gear. Herein the gear 22 normally constitutes a driving member, while the reaction member of the planetary gear device 12 is formed by a sun gear 25. Pinions 24, constituting planet gears, mesh with the gears 22 and 25. The pinions 24 are mounted on short shafts 26 supported on a carrier 27, herein the driven member, which carrier is splined at 28 to an intermediate shaft 29 rotatably mounted at one end by means of an anti-friction bearing 30 in a socket formed in drive shaft 10 and rotatably mounted at its other end in an antifriction bearing 41 positioned in an intermediate wall A'' of the casing. The carrier 27 comprises a disk 31 (Figs. 1 and 3) which is splined through a hub 31' to the shaft 29 and an annular member 32 having projecting portions or blocks 33 (Figs. 2 and 3) adapted to be disposed between the pinions 24 for spacing the member 32 longitudinally from the disk 31. The member 32 is secured to the disk 31 by a plurality of bolt and nut devices 33' terminating in recesses 34 in the blocks. An annular shield 35 carried by the gear 22 partially closes the open face of the planetary gear device.

Figure 3:
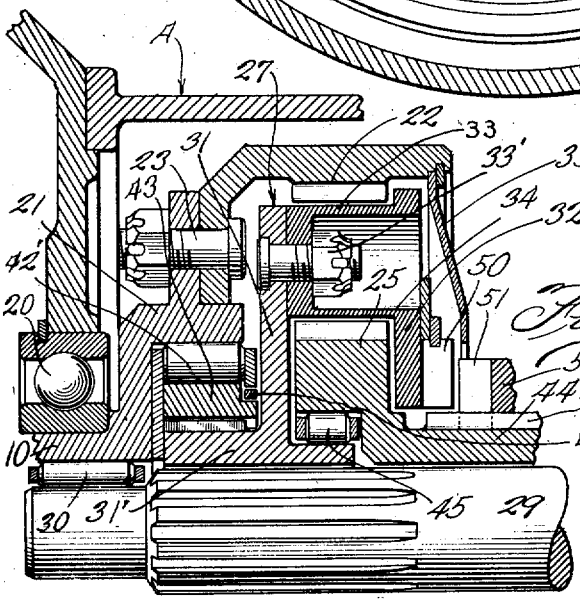
Fig. 3 is a fragmentary section along the line 3—3 of Fig. 2.
Figure 4:
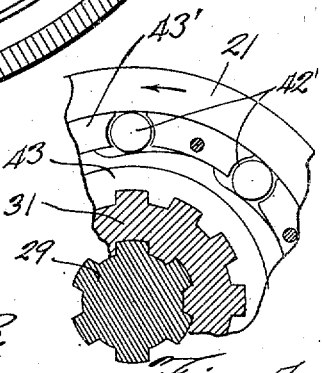
Fig. 4 is a fragmentary section along the line 4—4 of Fig. 1.
Figure 5:
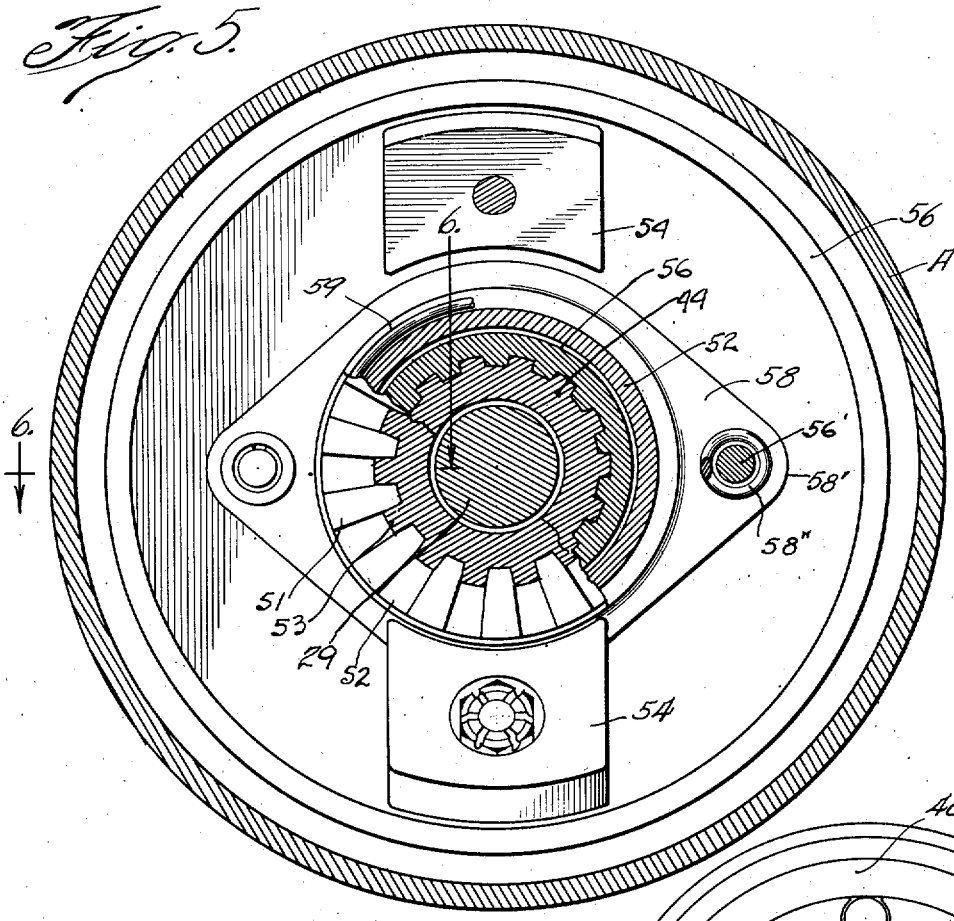
Fig. 5 is a section along the line 5—5 of Fig. 1.

For purposes which will hereinafter more fully appear, an overrunning or one-way clutch device 42 is inserted between a hub portion 31' of the carrier 27 and the flanged portion 21 of the drive shaft 10. As best seen in Figs. 3 and 4, the clutch device 42 comprises a cam member 43, splined to the hub portion 31' of the carrier 27, and wedging rollers 42'. The rollers are held in a retainer 43' which is urged by a single coil spring 43'' in a direction tending to wedge the rollers between the cam member and the flange portion 21, the spring being anchored at one end to the cam member 43 and at the other end to the retainer 43'. Herein the clutch device is arranged to permit the drive shaft 10 (and its flanged portion 21) to overrun the carrier 27 in a clockwise direction as viewed from the left in Fig. 1 (counterclockwise or in the direction of the arrow on shaft portion 21 in Fig. 4), but prevents the drive shaft from rotating in the opposite direction relative to the carrier 27, i. e., prevent the drive shaft from rotating slower than the carrier.

Figure 7:
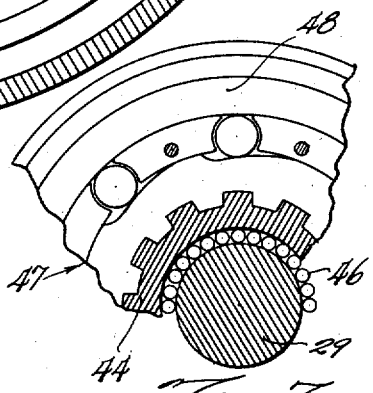
Fig. 7 is a fragmentary section along the line 7—7 of Fig. 1.

The sun gear 25 of the planetary gear device 12 (Fig. 1) is formed integrally with a sleeve 44 which surrounds the shaft 29 and is rotatably mounted at one end by means of an antifriction bearing 45 and at its other end by means of an antifriction bearing 46. An overrunning or one-way brake device 47, similar to clutch 42, is inserted between the right hand end of the sleeve 44 and an annular flange 48 projecting from the adjacent wall A'' of the casing. This brake device, as best seen in Fig. 7 serves to permit rotation of the gear 25 in a clockwise direction in Fig. 7 and to prevent rotation in the opposite direction.

The driven shaft 11 is rotatably mounted at its right hand end in an antifriction bearing 60 in the right hand wall of the casing A and at its inner end by means of an antifriction bearing 61 carried in a socket in the adjacent end of the intermediate shaft 29. The drive from the intermediate shaft to the driven shaft for first and second speeds is through the reduction gearing 15 which comprises a helical gear 62 on the intermediate shaft 29, a helical gear 63 on a parallel stub shaft 64, an overrunning clutch device 65 positioned intermediate the gear 63 and an adjacent coaxial helical gear 66, and a helical gear 67 splined at 68 on the driven shaft 11. Clutch device 65 also is similar to clutch 42 and herein is arranged to effect a driving engagement between the gears 63 and 66 when gear 63 is driving but to permit gear 66 to overrun gear 63.

Figure 2:
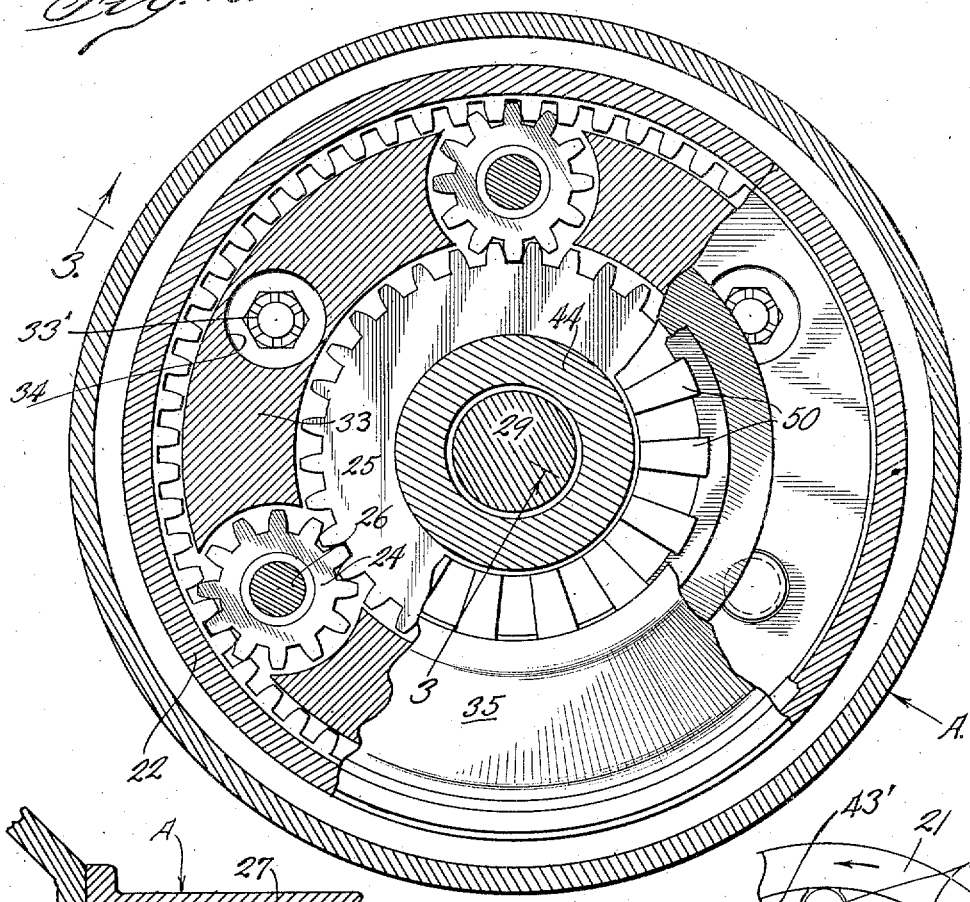
Fig. 2 is a section approximately along the line 2—2 of Fig. 1.
Figure 8:
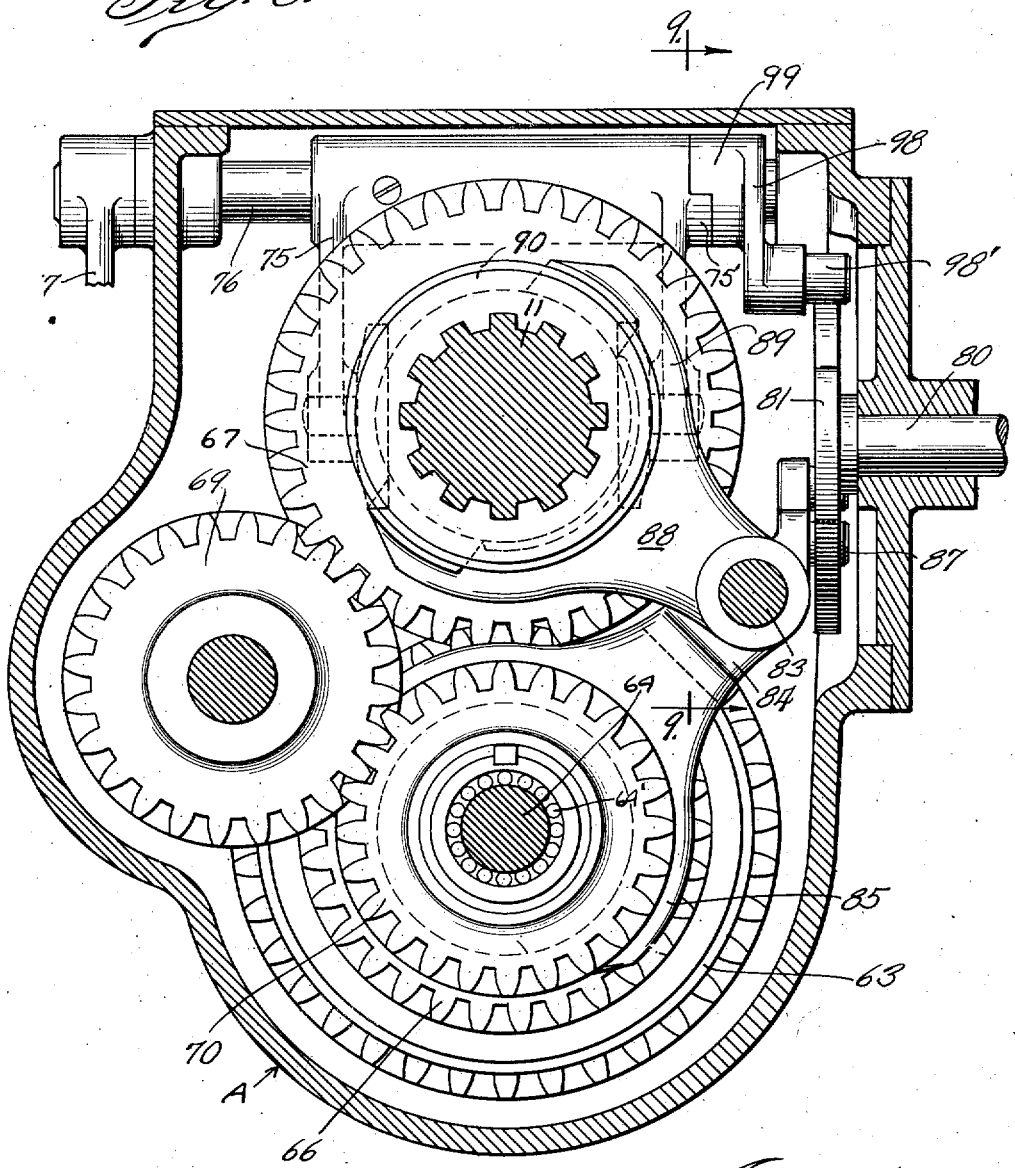
Fig. 8 is a section along the line 8—8 of Fig. 1.

The gear 67 is helically splined on the shaft 11 so that it may be shifted longitudinally thereon from the forward position shown in Fig. 1 toward the right to a neutral position wherein gear 67 is disengaged from gear 66, and further toward the right to a reverse position wherein gear 67 meshes with an idler gear 69 (Fig. 8) which idler gear meshes with a reverse gear 70 splined on a sleeve portion 63' of the gear 63 (the sleeve portion of the gear 63 being mounted on the shaft 64 by means of a pair of needle bearings 64').

As previously stated the transmission is automatically shifted from first directly from third and this is accomplished by effecting engagement of the clutch device 16, thus connecting the driven shaft 11 directly to the intermediate shaft 29 and cutting out the reduction gearing 15. The clutch device 16 is of the overrunning jaw type comprising jaws 72 formed on one face of the gear 62 and corresponding jaws 73 formed on a shiftable clutch collar 74. The jaws have bevelled or inclined faces 72' and 73' for the well known purpose of enabling the clutch to be urged toward engagement and yet remain disengaged until the respective jaws approach synchronous speed. Clutch 16 may be operated by suitable means tending to urge the collar 74 to the left (Fig. 1). Forming part of such means is a cross-shaft 76 having a yoke 75 fixed thereon and engaging the clutch collar 74.

Figure 10:
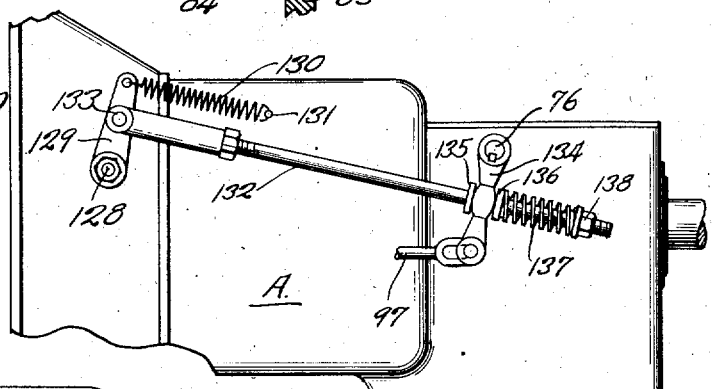
Fig. 10 is a side elevation of a transmission unit illustrating one form of control mechanism for clutch 16.
Figure 11:
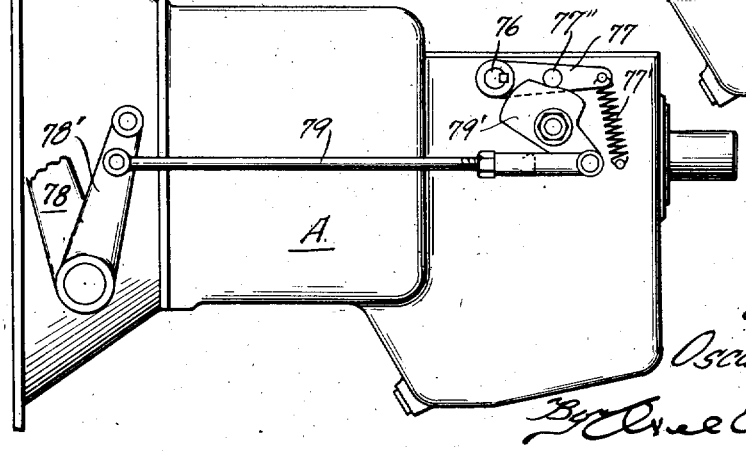
Fig. 11 is a side elevation of a transmission unit illustrating another form of control mechanism for clutch 16.

Two forms of operating mechanisms for the clutch 16 are illustrated herein, one form in Figs. 1 and 10 and the other in Fig. 11. In the form illustrated in Figs. 1 and 10, the clutch operating mechanism includes a separate centrifugal device C attached to the engine clutch housing D and a yieldable connection between the centrifugal device and clutch collar 74. The yieldable connection comprises a sleeve 120 (Fig. 1) slidable longitudinally on a hub 121 of the clutch housing D and provided with a flange 122 which abuts an arm portion 123 of the centrifugal device C, this centrifugal device being pivotally mounted on the clutch housing D by means including a pin 124. The other end of the sleeve 120 abuts a collar 125 which is provided with a pair of radially extending pins 126 which engage in notches in a bifurcated element 127 secured to a cross shaft 128. The shaft 128 projects through the casing A as shown in Fig. 10 and carries on its outer end an arm 129. A coiled spring 130 is connected intermediate the free end of the arm 129 and an anchoring device 131 on the casing A so as normally to hold the centrifugal device C in the inner position illustrated in Fig. 1. An adjustable connecting rod 132 is pivoted at one end to an intermediate portion of the arm 129 by means of a pin 133 and adjacent its other end passes through a suitable aperture in an arm 134 keyed to a projecting end of shaft 76. A collar 135 is fixed to the rod 132 and engages one side of the arm 134, while a slidable collar 136 on the rod 132 engages the other side of the arm 134 and is maintained in such engagement by means of a coil spring 137 positioned intermediate the collar 136 and a nut 138 threaded on the end of the rod 132. The spring 137 thus permits the centrifugal device C to move the rod 132 towards the left (Fig. 10) and urge collar 74 toward engagement with jaws 72. Such engagement, however, does not take place because of the bevelled faces 72' and 73' of the jaws until by deceleration of the car, the speed of jaws 72, i. e., intermediate shaft 29 has dropped down to and fractionally below the speed of collar 74, i. e., driven shaft 11. The centrifugal device C is effective to tension the spring 137 at a car speed of from 3 to 5 miles per hour so that shift from first to third may be made whenever the car is at or above that speed.

Figure 12:
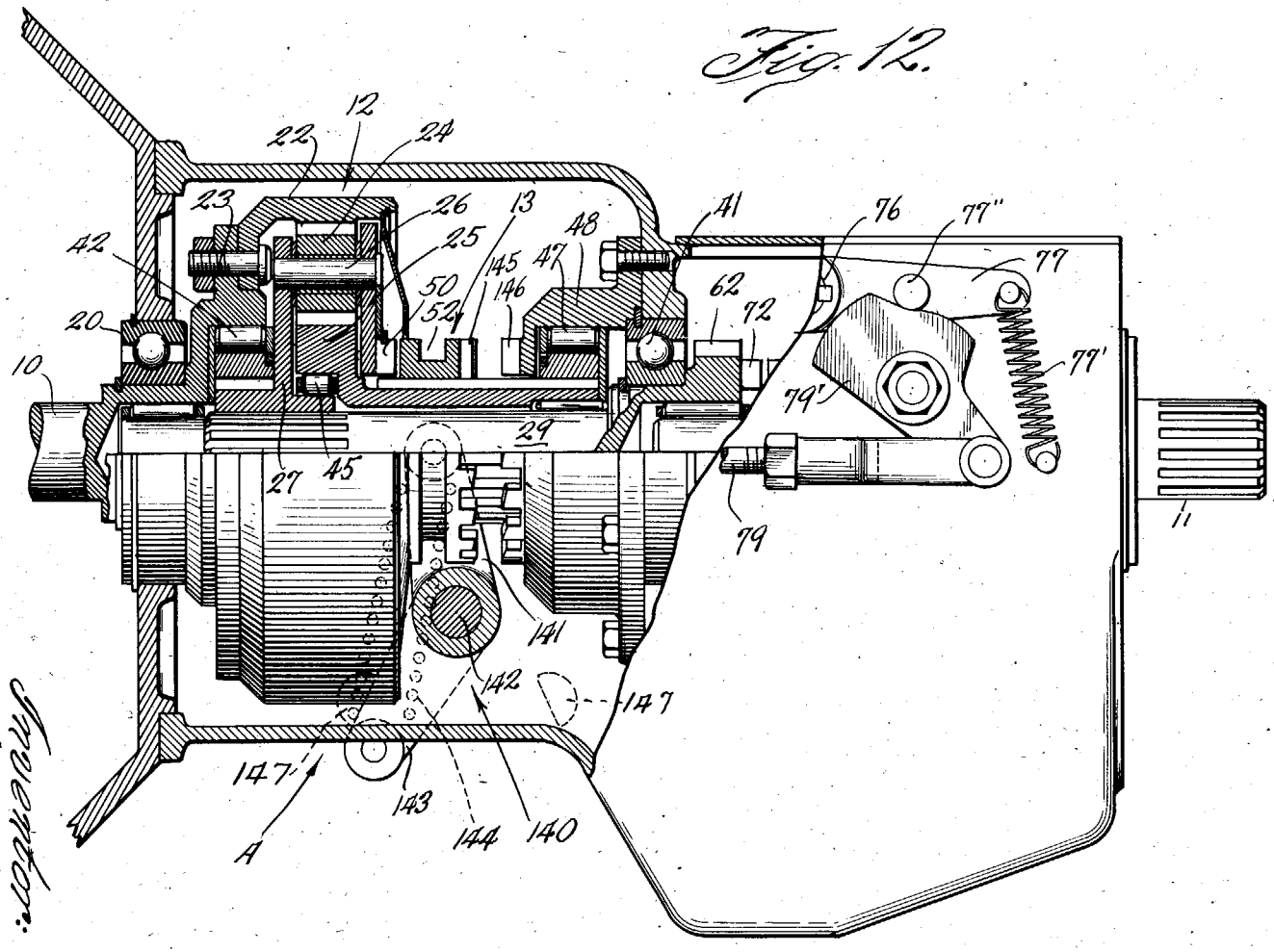
Fig. 12 is a view partially in longitudinal section of a transmission unit illustrating a modified form of control mechanism for shifting from third to fourth.
Figure 13:
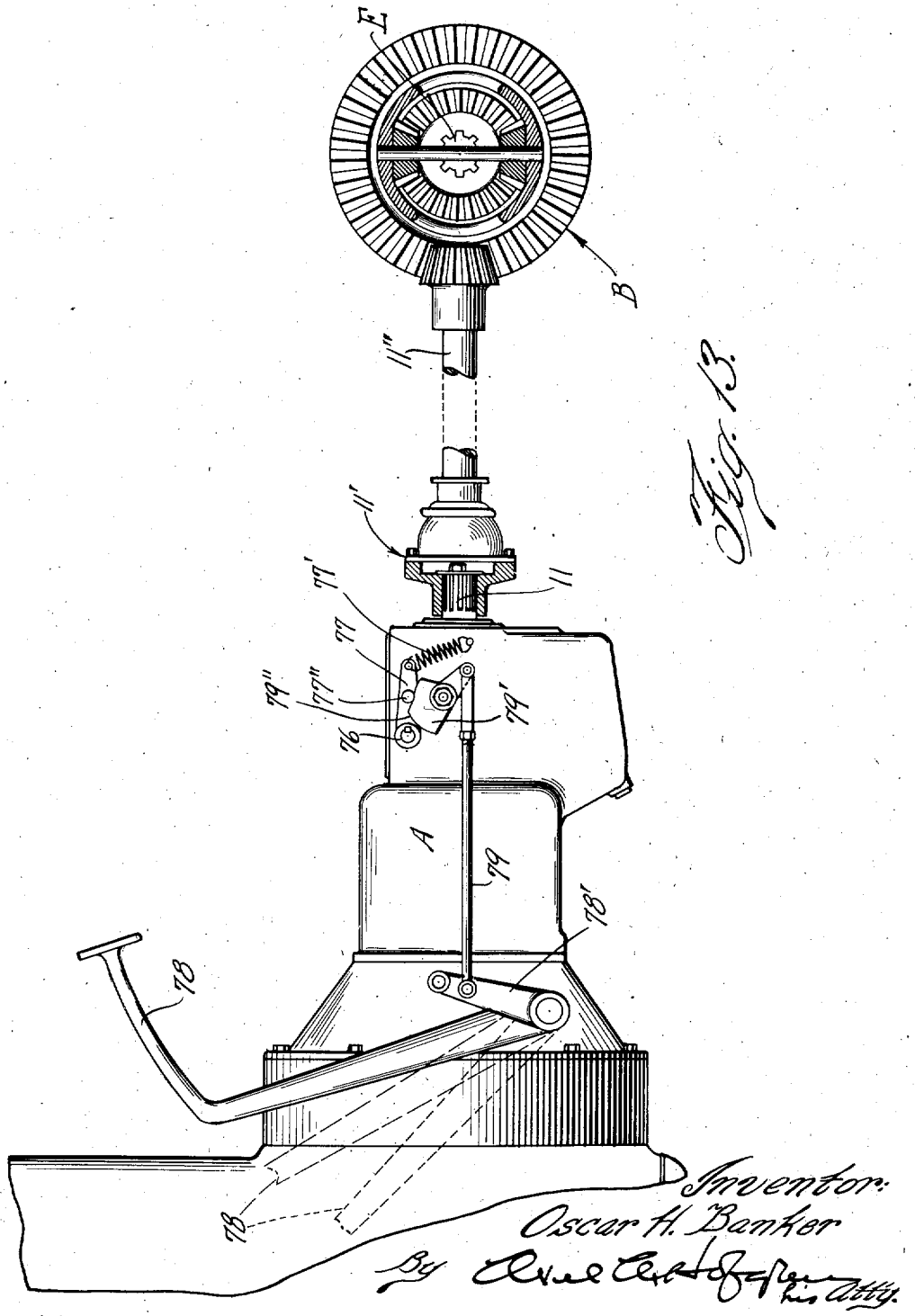
Fig. 13 is a view showing a transmission unit, drive shaft and rear axle gearing in operative relation.

In the second form of operating mechanism, shown in Figs. 11 to 13, an arm 77 is secured on the projecting end of shaft 76 and is urged by a tension spring 77' in a direction tending to shift collar 74 toward engaged position. This arm may be actuated by the engine clutch pedal 78 by means of an arm 78', a link 79, a cam 79' and a follower pin 77'' on arm 77, so that when the engine clutch is engaged (as in Fig. 11) the clutch collar 74 is tensioned toward its engaged position. Since in first and second speed the intermediate shaft 29 is rotating faster than the driven shaft 11, the inclined faces 72' and 73' on the clutch teeth slide over each other with the result that the clutch does not engage, but upon releasing the accelerator so that the intermediate shaft 29 slows down slightly below the speed of the driven shaft 11 the clutch teeth are thereupon engaged automatically to effect a shift from first speed to third speed.

Shift from third to fourth is effected by engagement of the clutch device 13 by the centrifugal means 14. Clutch device 13, which effects the shift by locking the planetary gear device 12 to cause the same to function as a unit, is of the overrunning jaw type. It is formed by means of jaws 50 on the carrier 27 and corresponding jaws 51 formed on a collar 52 splined at 53 to the sleeve 44 for movement longitudinally thereof. The faces of the jaws are bevelled in well known manner so that even though the jaws are yieldably urged toward one another they will not engage until they reach synchronous speed. For a purpose which will become apparent shortly, the jaws 50 and 51 are made to have a substantial blacklash when in engagement, which backlash is in excess of the total backlash in the planetary gear device.

Figure 6:
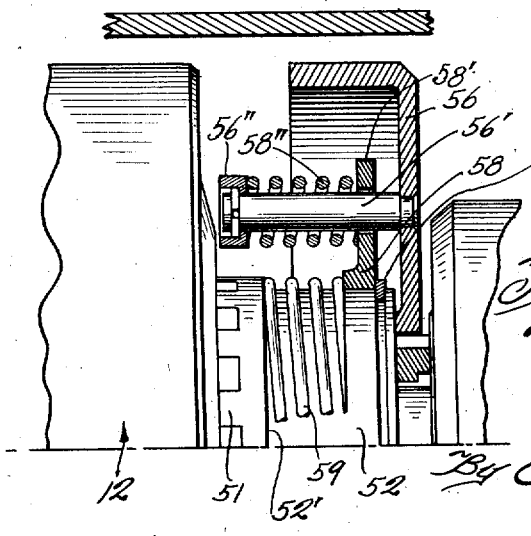
Fig. 6 is a fragmentary section along the line 6—6 of Fig. 5.

While the collar 52 may be shifted in a variety of ways, the centrifugal means 14 is herein employed. To that end centrifugal weights 54 are pivotally mounted on pins 55 on a plate 56 secured to the sleeve 44 for rotation therewith, and are operable, when they swing outwardly, to urge the clutch collar 52 toward the jaws 50 by means of an arm portion 57 on each weight, a slidable collar 58 on the collar 52, and a coiled spring 59 interposed between collar 58 and an annular shoulder 52' on collar 52 (see Fig. 6). The collar 58 is limited in its movement to the right by a split ring 52'' secured in a groove of the collar 52. Guide pins 56' (Fig. 6) extend from the plate 56 through apertures in laterally extending ears 58' on the collar 58 and have retaining devices 56'' on their outer ends between which and the collar 56 coiled compression springs 58'' are positioned. These springs serve to urge the weights 54 toward their inner or inoperative position.

When the drive shaft 10 (Fig. 1) is operated in a clockwise or "forward" direction (looking at the left hand end of the figure) and the sun gear 25 is held against rotation, the carrier 27 will also rotate in clockwise or "forward" direction. Under these conditions the sun gear 25 tends to rotate in a counterclockwise or "reverse" direction. Such reverse rotation of the sun gear, however, is prevented by means of the uni-directional or overrunning brake device 47 which, as previously described, functions to hold the sun gear against such reverse rotation. If, however, the drive shaft 10 is suddenly reduced in speed as, for example, by releasing the accelerator of the engine, there is a reversal of torque through the planetary gear device due to the momentum of the vehicle, causing the driven shaft 11 to become in effect a drive shaft. This reversal of torque through the planetary gear device causes the sun gear 25 and the plate 56 keyed thereto to rotate in a "forward" or clockwise direction free from any restraining action of the brake device 47. Thus by releasing the accelerator the attendant reversal of torque effects the rotation of the weight carrying plate 56 and the outward movement of the weights 54. When the vehicle is operating above a preselected speed, say 30 miles per hour, releasing the accelerator so as to slow down the drive shaft 10 causes the weights to urge the clutch collar 52 toward the left (Fig. 1) to engage the jaws 50. However, because of the beveled surfaces on the jaws 50 and 51, final engagement does not take place until the carrier 27 and the clutch collar 52 reach synchronous speed at which time the carrier speed also will be identical with the speed of the drive shaft 10.

It is to aid and insure the final engagement of the jaws 50 and 51 that the overrunning clutch 42 and the backlash between the jaws are provided. The overrunning clutch 42, as previously described, prevents the drive shaft 10 from dropping below the speed of the carrier 27, thereby quickly bringing the drive shaft, the carrier and the clutch collar 52 to rotate in unison, and thus synchronize the speed of the carrier and the clutch collar which is necessary for engagement of the jaws thereof. The backlash between the jaws 50 and 51 assures that the jaws will engage before the overrunning device 42 becomes effective to hold the carrier and the drive shaft 10 against relative rotation. This backlash between jaws 50 and 51 also serves to facilitate disengagement of the jaws should the overrunning device 42 hold the carrier 27 and the drive shaft 10 against relative rotation after all backlash in the planetary gear device has been taken up. When final engagement between the jaws 50 and 51 does take place, intermediate shaft 29 is then caused to rotate in unison with drive shaft 10. The driven shaft 11, because of engagement of clutch 16, is already rotating in unison with the intermediate shaft 29 and thus the transmission is in fourth gear with the driven shaft rotating in unison with the drive shaft. The engine is now transmitting torque to the rear axles at approximately the same ratio obtained with the present day overdrive but obtains such transmission of torque with only the rear axle gearing in operation.

The overrunning device 42 serves a second function in that it assures that the engine will always be available as a brake when the transmission is in third or fourth gear. When the transmission is in fourth gear the clutch device 13 is in engagement compelling the planetary gear device to function as a unit, thereby locking the drive shaft 10 to the intermediate shaft 29 which in turn is locked to the driven shaft 11, the overrunning device being wholly eliminated from the drive train at that time. When the transmission is in third gear the engine is effective to brake the car because the overrunning device 42 prevents the drive shaft 10 from dropping below the speed of the carrier 27. As the car is decelerated, by releasing the accelerator pedal, the torque through the planetary gear device is reversed and with a slowing down of the motor the carrier 27 is caused to rotate at an increased speed. Because of the overrunning device 42 this speed cannot exceed that of the drive shaft 10 and thus will compel the carrier to pick up and rotate with it the drive shaft and hence the engine.

Herein second is employed largely for hill climbing and similar purposes and is reached through fourth. With the transmission in fourth, second is obtained by disengaging the clutch device 16, thereby again placing the reduction gearing 15 in operation. In both forms of operating mechanism for the clutch collar 74, shift to second is effected manually. In the form of operating mechanism shown in Fig. 10, disengagement of the clutch collar 74 is effected by some manually actuated means, not shown, connected by a rod 97 to the free end of the arm 134. The rod 97 and the arm 134 have a lost motion connection enabling the arm 134 to function independently of the rod 97 when the rod is in the position shown in Fig. 10, while at the same time enabling the rod 97 upon a shift to the right positively to disengage the collar 74. With the actuating mechanism shown in Fig. 11, no manual means in addition to that shown is necessary. Rocking of the clutch pedal 78 in a counterclockwise direction, as viewed in Fig. 11, causes the cam 79' to swing arm 77 upwardly, thereby positively disengaging collar 74 if it is not already disengaged.

As illustrated herein a manual control is provided for locking out the overrunning clutch 65 and for shifting the transmission from forward to neutral or reverse and vice versa. This control includes a cam shaft 80 (Figs. 8 and 9) which may be suitably connected to a control device on the dash of the car. A cam disk 81 is mounted on the shaft 80 and has its periphery engaged by a follower 82' of an actuator 82 slidably mounted on a rod 83 and urged by a compression spring 83' in a direction to maintain the follower 82' in contact with the cam. The actuator 82 is provided with an extending portion 84 bifurcated at 85 to engage a manually shiftable clutch element 118 (Fig. 1) splined on a sleeve 70' of the reverse gear 70 which in turn is keyed to the sleeve 63' as previously described. Formed on the clutch element 118 are teeth 118' adapted upon a shifting of the clutch 118 to the left, as viewed in Fig. 1, to engage with cooperating teeth 66' formed internally of the gear 66. It will be apparent that by such engagement the overrunning clutch 65 is locked out so as to eliminate freewheeling when the transmission is in first or second gear.

To effect a shift of the gear 67 to forward, neutral or reverse position, the cam disk 81 has a cam slot 86 therein (see Fig. 9) in which a follower 87 engages, said follower being carried on an actuator 88 slidable on the rod 83 and provided with a bifurcated portion 89 engaging in the peripheral groove 90 in the gear 67. Also controlled by the cam disk 81 is an arm 98 carrying a follower 98' at its free end and pivotally mounted at its other end on the shaft 76. This arm has a lost motion connection with the yoke 75, actuating the collar 74 of clutch 16, and to that end is provided with an arcuate axial extension 99 adapted to cooperate with an arcuate axial extension 75' on the yoke 75. The total arcuate length of these extensions is less than 360° so as to provide play between the extensions as at 100, permitting shifting of the collar 74 when the cam disk is in forward position, as shown in Fig. 9, but positively disengaging collar 74 when the cam disk 81 is shifted to neutral position, that is with the cam 81 rotated counterclockwise approximately 45°.

Figure 9:
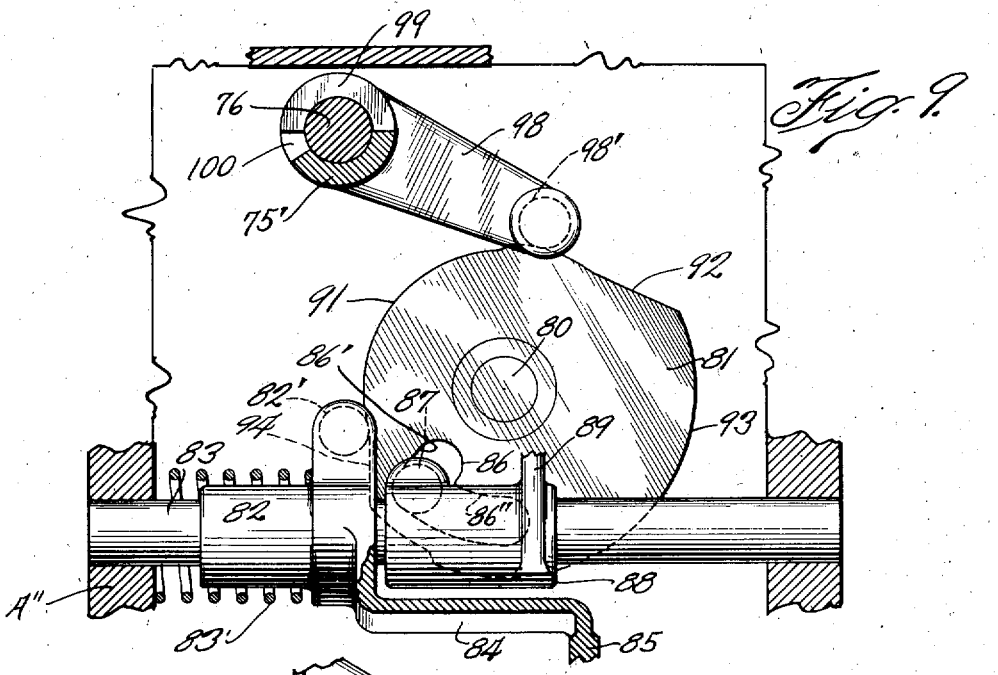
Fig. 9 is a section along the line 9—9 of Fig. 8.

With the parts in the positions shown in Figs. 1 and 9, the control disk 81 as well as the shiftable gear 67 is in forward position. To shift the gear 67 to neutral position the cam disk 81 is rotated counterclockwise, as viewed in Fig. 9, whereupon the radial portion 86' of the slot 86 engages follower 87 to shift actuator 88 to the right and thereby shift gear 67 to neutral position. During such rotation the follower 82' rides on the dwell surface 91 and thus remains in the position shown in Fig. 9, and the clutch element 118 correspondingly remains in its normal, disengaged position. Follower 98' rides on the cam surface 92 and thus swings the arm 98 upwardly with the result that the extension 99 would engage the extension 75' and thereby disengage clutch collar 74 if it is not already disengaged. To shift the gear 67 to reverse, the cam disk 81 is given a further counterclockwise rotation, as viewed in Fig. 9. The radial portion 86' of the slot 86 would then shift the actuator 88 a step farther causing gear 67 to mesh with reversing gear 70. During such further rotation the follower 82' would continue to ride on the dwell surface 91, while follower 98' would now ride on a dwell surface 93 thereby retaining the clutch collar 74 in disengaged position.

To lock out the overrunning clutch 65 the cam disk 81 is rotated in a clockwise direction from the position shown in Fig. 9. During such rotation cam surface 94 would engage follower 82' to shift actuator 82 to the left thereby engaging clutch element 118 with gear 66. At the same time the follower 87 would ride in the arcuate portion 86'' of the slot 86, thereby leaving actuator 88 in the position shown in Fig. 9, while the follower 98' would ride on the dwell surface 91 leaving the clutch collar 74 free to move to the left in Fig. 1. However, with the overrunning clutch 65 locked out in this manner the clutch collar 74 cannot be synchronized with gear 62 and therefore the clutch 16 cannot be engaged.

The operation of the transmission in the form illustrated in Figs. 1 to 10 will now be described. It is contemplated that the clutch drum D illustrated in Fig. 1 may be one element of a manually operable clutch, the other element of which is controlled by the usual clutch pedal or, if desired, the clutch drum D may be one element of an automatic clutch. Such clutches may be of the type disclosed in applicant's Patent No. 2,042,454, dated June 2, 1936. Furthermore clutch element D may represent one element of such well known automatic power transmitting mechanism as a fluid flywheel. An automatic engine clutch device is preferably used with the form of the invention illustrated in Figs. 1 to 10, so that when the engine is idling the engine clutch is disengaged and upon increasing the speed of the engine the engine clutch automatically engages at a predetermined speed.

Let it be assumed that the engine with which the transmission is associated is running at an idling speed and that the transmission is in neutral. Under those conditions, gear 67 is shifted to neutral position out of engagement with gear 66 and clutch collar 74 is positively shifted to disengage clutch 16 by the cam disk 81, which also is in neutral position, i. e., rotated counterclockwise approximately 45° from the position in Fig. 9. Clutch 13 likewise is disengaged because the centrifugal device 14 is not rotating. To start the car forward in first gear, the engine clutch associated with drum D is disengaged and the cam disk 81 then rotated in a clockwise direction, as viewed in Fig. 9, to forward position as shown in Fig. 9. Such rotation of the cam disk 81 shifts the gear 67 into engagement with the gear 66 and also releases the clutch collar 74 for shifting movement but does not effect a shift thereof. The transmission is now in first gear and the vehicle will run in a forward direction, the torque being transmitted from drive shaft 10 through the planetary gear device 12, shaft 29, reduction gearing 15, and gear 67 to the driven shaft 11. As the car is accelerated the centrifugal device C is actuated and thus through link 132 and spring 137 urges the clutch collar 74 toward engagement with the clutch jaws 72. Engagement of the clutch, however, does not take place because the faces of the jaws are bevelled and the jaws 72 are rotating at a greater speed than are the jaws 73.

While final engagement of the jaws 72 and 73 is effected by the centrifugal device C and the spring 137, the time of such engagement is determined by the operator of the car. To effect such engagement, the operator simply releases the accelerator pedal thereby causing the gear 62 to slow down rapidly while clutch collar 74 continues to rotate with but a slight reduction in speed. As gear 67 drops down to and just a fraction of a revolution below the speed of the clutch collar 74, the jaws 72 and 73 are engaged thereby directly connecting the driven shaft 11 to the intermediate shaft 29 and cutting out the reduction gear 15. The transmission now is in third gear, and the torque from drive shaft 10 is transmitted through the planetary gear device 12, the intermediate shaft 29, and clutch 16 directly to the driven shaft 11. With the high speed rear axle gearing herein disclosed as employed, third gear corresponds to high gear of ordinary transmissions.

When the car has obtained a speed of thirty miles or more, the transmission may be shifted to fourth gear which with the high speed rear axle gearing corresponds to the overdrive employed with some transmissions. This shift again is made automatically but with the time of shift under the control of the operator of the car. To effect the shift from third to fourth, the operator again releases the accelerator thereby permitting the engine to drop to idling speed. Such release of the accelerator pedal effects a reversal of the torque in the transmission with the result that the driven shaft 11 now in effect becomes a drive shaft. As an incident to such reversal of torque, the disk 56, carrying centrifugal weights 54, which heretofore had been held against counterclockwise rotation as viewed from the drive shaft end of Fig. 1, is now rotated in a clockwise direction and in such rotation is unrestrained by the overrunning brake 47. With such rotation of the disk 56 the centrifugal weights 54 are thrown outwardly thereby shifting collar 58 and through spring 59 urging clutch collar 52 in a direction to effect engagement with clutch jaws 50 formed on the planet gear carrier 27. Jaws 50 and 51 again have beveled faces so that engagement does not take place until the rotation of the jaws is synchronized, that is, when the planetary gear device is operating as a unit. Such engagement is aided and facilitated by the provision of the overrunning clutch 42 which, as previously described in detail, prevents the drive shaft 10 from dropping below the speed of the carrier 27 and thus tends to lock the planetary gear device when the carrier and the drive shaft are rotating at the same speed, that is, when the planetary gear device is operating as a unit. Engagement of the jaws 50 and 51 prior to such locking of the drive shaft and carrier 27 is assured by the provision of the large back-lash between the jaws which is in excess of the total back-lash in the planetary gear device. With the clutch 13 engaged, the intermediate shaft 29 is in effect coupled directly to the drive shaft 10 thereby causing the entire transmission to transmit the torque in the ratio of 1 to 1 because the driven shaft 11 already is directly connected to the intermediate shaft 29.

It will be apparent from the foregoing that in both third and fourth gear the engine is available for braking the car because in fourth gear there is a direct and positive connection of the driven shaft 11 with the drive shaft 10, totally cutting out the overrunning clutch 42. In third gear the engine is available to brake the car because the overrunning clutch 42 prevents the carrier 27 from exceeding the speed of rotation of the drive shaft 10. This is an extremely desirable characteristic of the transmission for it gives to the operator a control over the car not found in a transmission having freewheeling at corresponding gears.

First, third and fourth gears usually provide a range of gear ratios required for normal driving conditions. Second gear is employed primarily for hill climbing and similar purposes and to that end is reached through fourth gear. To effect the shift to second gear, the clutch 16 is positively disengaged again to restore the reduction gearing 15 in the drive train, while the planetary gear device continues to function as a unit. Such disengagement of the clutch 16 is effected manually and with the form of actuating mechanism shown in Fig. 10 is accomplished through the manipulation of suitable means, not shown, acting through the rod 97 to rock shaft 76.

In the form of operating mechanism shown in Fig. 11, the clutch 16 is disengaged by depressing the clutch pedal 78 all the way to extreme left position, shown in dotted lines in Fig. 13, whereby rod 79 rotates cam 79' which in turn acts through arm 77 and shaft 76 positively to withdraw the clutch collar 74. With the form of operating mechanism illustrated in Figs. 11 and 13, it is contemplated that the foot pedal 78 may be moved from the full line position of Fig. 13 (wherein the engine clutch is engaged) to the extreme left position, shown in dotted lines in Fig. 13, wherein the engine clutch is disengaged. In the intermediate dashed line position illustrated the engine clutch is also engaged, the movement of the pedal 78 from the intermediate position to the full line position being possible because of the lost motion provided in the intermediate connections so as to insure that the clutch will be fully engaged when the pedal is released. The connections between the arm 78' and the shaft 76 are so designed that when the pedal 78 is moved from its full line position of Fig. 13 to the intermediate dashed line position the cam 79' is rotated so that the high point 79'' raises the roller 77'' and thereby rotates the shaft 76 to hold the clutch collar 74 out of engagement with clutch teeth 72. Thus the clutch 16 may be disengaged without disengaging the engine clutch. However, when the foot pedal is released and moves to its full line position the roller 77'' rides down on the lower portion of the cam 79' thus allowing the arm 77 to rotate the shaft 76 under the influence of spring 77' so as to permit engagement of the clutch 16 when the parts thereof are properly synchronized.

With this arrangement it is therefore possible for the operator to disengage the clutch 16 to shift gears by depressing the pedal 78 half way without disengaging the engine clutch. Furthermore when starting, with the motor running and the pedal 78 in its fully depressed position, the operator may by releasing the pedal half way, to its intermediate position, engage the engine clutch and start the car while still holding the clutch 16 disengaged until the gearing is in full operation, after which the pedal 78 may be fully released to its full line position of Fig. 13 without danger of starting in third speed instead of first.

In this form of the invention, the clutch collar 74 is urged toward engaged position upon proper release of the clutch pedal and does not depend upon centrifugal means for its actuation as does the form of operating mechanism shown in Figs. 1 and 10. Engagement of the clutch 16, however, does not take place until by deceleration of the engine the gear 62 has been brought down to and generally a fraction of a revolution below the speed of rotation of the clutch collar 74, to fully synchronize collar 74 with gear 62 and position the clutch teeth thereof in engaging relation.

With either form of mechanism disengagement of clutch 16 when the transmission is in fourth gear returns the transmission to second gear, and disengagement of clutch 16 when the transmission is in third gear returns the transmission to first gear.

It will be noted that in first and second gear the reduction gearing 15 is always in the drive train and thus permits of freewheeling because of the overrunning clutch 65. This overrunning clutch may be locked out and the freewheeling eliminated at the option of the operator of the car. Such locking out of the overrunning clutch 65 is effected simply by rotating the cam disk 81 still farther in a clockwise direction, as viewed in Fig. 9. During such rotation of the cam disk, follower 87 which shifted the gear 67 from neutrol to forward position now rides idly in the arcuate slot portion 86'' while the cam follower 82' rides on a cam portion 84 and with its actuator 82 is forced to the left, as viewed in Figs. 1 and 9, and thus shifts the clutch 118 into engagement with the gear 66. This couples the gear 66 directly to the gear 63 cutting out the overrunning clutch 65. It will be apparent that the cam disk 81 may be rotated to lock out the clutch 65 or to again render the same operative without affecting the remainder of the transmission.

To bring the car to rest, the clutch pedal 78 is depressed and the cam disk 81 rotated in a counterclockwise direction back to neutral position thereby again shifting the gear 67 to the right, as viewed in Fig. 1, to a position intermediate the gear 66 and gear 70. Reverse is obtained by rotating the cam disk 81 in a counterclockwise direction, as viewed in Fig. 9, from neutral position. Such rotation of the cam disk 81 causes the actuator 89 to be shifted to the right, as viewed in Figs. 1 and 9, and causes gear 67 to mesh with gear 70 through the idler gear 69.

Fig. 12 shows a modified form of actuating means for the clutch 13, the remainder of the transmission being of the construction shown in Figs. 1 to 9, 11 and 13. In the modified form shown in Fig. 12, the clutch collar 52 is urged to clutch engaging position by a tensioning means generally designated 140 but final engagement thereof is still controlled by the operator through deceleration of the engine. The means for tensioning the clutch collar 52 toward clutch engaged position comprises a yoke 141 engaging the collar and pivotally mounted on a shaft 142 extending transversely of the transmission. An arm 143 also pivotally mounted on the shaft 142 and having a limited lost motion with respect to the yoke 141 is connected to the yoke by a spring 144 to form an overcenter device out of the tensioning means. Suitable means, not shown, is connected to the arm 143 to swing the same to the position shown in Fig. 12 in which the spring 144 urges the collar 52 toward engagement with jaws 50 or to the opposite overcenter position at which time the spring 144 would withdraw the collar 52 from engagement with the jaws 50 and tend to cause engagement of jaws 145 formed on the opposite end of the clutch collar with jaws 146 formed on the annular flange 48. With this form of tensioning means for the clutch 13, the clutch collar may be present at any time desired by the operator with engagement postponed and controlled until the engine is decelerated. With this construction clutch 13 may be engaged at the time desired by the operator without reference to the speed of the car and, moreover, the clutch 13 may be retained disengaged when the engine is decelerated even though the car may be travelling at more than thirty miles per hour, at which the clutch 13 is engaged in the form of the transmission shown in Fig. 1. The operation of the transmission shown in Fig. 12 is identical with that shown in Fig. 1 with the exception of the means for actuating the clutch 13. Lugs 147 limit the movement of arm 143.

I claim as m invention:

1. In an automatic transmission for automotive vehicles, a casing, a first shaft and a second shaft rotatably mounted in said casing, a planetary gear device adapted to be interposed between said shafts comprising a first gear fixed on said first shaft, a second gear rotatable relative to said second shaft, planet gears meshing with said first and second gears and a planet gear carrier keyed to said second shaft, an overrunning clutch interposed between said planet gear carrier and said first shaft preventing said first shaft from dropping below the speed of said planet gear carrier, a one-way brake interposed between said second gear and said casing permitting said second gear to rotate in one direction but preventing rotation thereof in the opposite direction for rendering said planetary gear device operative, a clutch collar rotatable with said second gear and adapted to engage said planet gear carrier to cause said planetary gear device to operate as a unit, and means for urging said clutch collar toward engaged position, final engagement being under the control of the operator.

2. In an automatic transmission for automotive vehicles, a casing, a first shaft and a second shaft rotatably mounted in said casing, a planetary gear device adapted to be interposed between said shafts comprising a first gear fixed on said first shaft, a second gear rotatable relative to said second shaft, planet gears meshing with said first and second gears and a planet gear carrier keyed to said second shaft, an overrunning clutch interposed between said planet gear carrier and said first shaft preventing said first shaft from dropping below the speed of said planet gear carrier, a one-way brake interposed between said second gear and said casing permitting said second gear to rotate in one direction but preventing rotation thereof in the opposite direction for rendering said planetary gear device operative, a clutch collar rotatable with said second gear and adapted to engage said planet gear carrier to cause said planetary gear device to operate as a unit, and centrifugal means carried by said second gear and operable upon rotation to urge said clutch collar toward engaged position, final engagement of the clutch being under the control of the operator.

3. In an automatic transmission for automotive vehicles, a casing, a first shaft and a second shaft rotatably mounted in said casing, a planetary gear device adapted to be interposed between said shafts comprising a first gear fixed on said first shaft, a second gear rotatable relative to said second shaft, planet gears interposed between said first and second gears and a planet gear carrier keyed to said second shaft, an overrunning clutch interposed between said planet gear carrier and said first shaft preventing said first shaft from dropping below the speed of said planet gear carrier, a one-way brake interposed between said second gear and said casing permitting said second gear to rotate in one direction but preventing rotation thereof in the opposite direction for rendering said planetary gear device operative, a clutch collar rotatable with said second gear and adapted to engage said planet gear carrier to cause said planetary gear device to operate as a unit, and an overcenter tensioning device manually settable to urge said clutch collar toward engaged position, final engagement of the clutch being under the control of the operator.

4. A transmission for an automotive vehicle, compirsing, in combination, a casing, an engine drive shaft and a driven shaft rotatably mounted in said casing, reduction gearing interposed between said drive shaft and said driven shaft connectible in at least first, second and third gear, said gearing including an overruning clutch operative when the transmission is in first or second gear to provide freewheeling, means operative when the transmission is shifted to any gear above second to render the engine effective for braking the vehicle, and manually actuable means for completing a gear train excluding said overrunning clutch to render the engine effective for braking the vehicle at all speeds.

5. An automatic transmission for obtaining first, second, third and fourth speeds in automotive vehicles comprising, in combination, a drive shaft, a driven shaft, a first reduction gearing and a second reduction gearing between said drive and driven shafts, both gearing being operative to obtain said first gear, means for connecting said drive shaft to said driven shaft through said first reduction gearing and independently of said second reducting gearing when said first reduction gearing is in operation to obtain said third speed, means for effecting the drive of said driven shaft to rotate at the same speed as said drive shaft to obtain said fourth speed, and means for effecting the drive of the driven shaft through said second reduction gearing to obtain said second speed, said second reduction gearing including a unidirectional clutch permitting said driven shaft to overrun said drive shaft when the transmission is in second speed, and a unidirectional clutch between the drive and driven shafts effective to prevent the drive shaft from dropping below the speed of the driven shaft to obtain braking by the engine of the vehicle in third speed.

6. In a transmission mechanism, coaxial drive and driven members, a gear free to rotate relative to the drive and driven members, positive type clutch means adapted when engaged to establish a certain speed reduction ratio between said drive and driven members through a gear train including said gear, a second positive type clutch means adapted when engaged to prevent relative rotation between said gear and the drive member, whereby direct drive will be established between the drive and driven members by way of said gear and both said clutches, and a unidirectional clutch between the drive and driven shafts effective to prevent the drive shaft from dropping below the speed of the driven shaft to obtain braking by the engine of the vehicle when the transmission mechanism is in said first mentioned speed reduction ratio.

7. An automatic transmission for obtaining first, second, third and fourth speeds in automotive vehicles comprising, in combination, a drive shaft, a driven shaft, a first reduction gearing and a second reduction gearing between said drive and driven shafts, both gearing being operative to obtain said first gear, means for connecting said drive shaft to said driven shaft through said first reduction gearing and independently of said second reduction gearing when said first reduction gearing is in operation to obtain said third speed, means for effecting the drive of said driven shaft to rotate at the same speed as said drive shaft to obtain said fourth speed, and means thereafter operable for effecting the drive of the driven shaft through said second reduction gearing to obtain said second speed, said second reduction gearing including a unidirectional clutch permitting said driven shaft to overrun said drive shaft when the transmission is in second speed, and a unidirectional clutch between the drive and driven shafts effective to prevent the drive shaft from dropping below the speed of the driven shaft to obtain braking by the engine of the vehicle in third speed.

OSCAR H. BANKER.